US008771144B2

(12) United States Patent
Dickinson et al.

(10) Patent No.: US 8,771,144 B2
(45) Date of Patent: Jul. 8, 2014

(54) MANUAL DOWNSHIFT CONTROL METHOD FOR AUTOMATIC TRANSMISSION (75) Inventors: Mike Dickinson, Hilliard, OH (US); Aaron Dorn, Richmond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1382 days.

(21) Appl. No.: 12/176,455

(22) Filed: Jul. 21, 2008

(65) Prior Publication Data
US 2010/0016120 A1    Jan. 21, 2010

(51) Int. Cl.
*B60W 10/04* (2006.01)
(52) U.S. Cl.
USPC .......................................... 477/107; 477/109
(58) Field of Classification Search
USPC ................................................ 477/107, 109
See application file for complete search history.

(56) References Cited

U.S. PATENT DOCUMENTS

| 4,891,759 A | 1/1990 | Kato |
| 5,036,729 A | 8/1991 | Nitz et al. |
| 5,772,554 A | 6/1998 | Tabata |
| 6,132,334 A | 10/2000 | Tabata et al. |
| 6,277,051 B1 | 8/2001 | Yeo |
| 7,089,102 B2 | 8/2006 | Slayton et al. |
| 2006/0040791 A1* | 2/2006 | Nakajima et al. ............. 477/111 |
| 2007/0207889 A1* | 9/2007 | Costello ........................ 475/263 |

* cited by examiner

*Primary Examiner* — Derek D Knight
(74) *Attorney, Agent, or Firm* — Mark E. Duell; Emerson Thomson Bennett, LLC (57) ABSTRACT A control system and a method for controlling an automatic transmission that determines the disengagement of an off-going clutch and the engagement of an on-coming clutch by monitoring the corresponding hydraulic clutch pressures, and/or the calculated gear ratios with or without the assistance of off-pressure timer controls, or both.

17 Claims, 5 Drawing Sheets

MANUAL DOWNSHIFT CONTROL METHOD FOR AUTOMATIC TRANSMISSION

I. BACKGROUND OF THE INVENTION

A. Field of Invention

This invention pertains to the art of methods and apparatuses regarding vehicle automatic transmission systems, and more particularly to methods and apparatuses regarding autonomous throttle control during manual downshifting at low accelerator pedal openings.

B. Description of the Related Art

It is known to couple an engine to an automatic transmission via an input shaft and a torque converter. The torque converter is a fluid coupling which allows the engine and the input shaft to turn at different speeds or rotations per minute (RPM). The automatic transmission includes a plurality of gears and associated components that are manipulated to drive an output shaft using different gear ratios such that the torque transferred from the engine is either increased or reduced. The gear ratio is the speed of rotation of the input shaft compared to the speed of rotation of the output shaft.

It is known to use a transmission controller in an automatic transmission to monitor various vehicle operating conditions and driver inputs to determine whether a change in gear ratio, for example, an up-shift or a downshift, should occur. The transmission controller controls a plurality of clutches and brakes by selectively applying or releasing hydraulic pressure to effect changes in the gear ratio. During a downshift, an off-going component or clutch gradually disengages the present gear as an on-coming component or clutch gradually engages the next lower gear. Commonly, the transmission controller controls the disengagement or release of the off-going component based on the rate of engagement of the on-coming component. The downshift causes a numerical increase in the gear ratio, or an increase in the difference between the transmission input shaft speed compared to the transmission output shaft speed. For example, at a first speed in a third gear, the gear ratio may be 1.195:1, or if the input shaft speed is 3,000 rpm then the output shaft speed is about 2,510 rpm. Comparatively, in a second gear, the gear ratio may be 1.568:1. Therefore, at the first speed in the second gear, to maintain the output shaft speed of 2,510 rpm, the input shaft speed must rotate at about 3,936 rpm. The numerical increase in gear ratio causes the speed of the input shaft to rise in proportion to the ratio change.

It is known to arrange automatic transmissions to change gears, and thus speed ranges, dependent on various running conditions of the corresponding vehicle. Typically, a shift map is provided that is composed of up-shifting and down-shifting lines for each speed range. The lines of the shift map may be established in relation to certain variables such as, for example, the vehicle speed, the opening of a throttle valve, and the intake vacuum, which may represent the engine-power output. Recently, automatic transmissions have been arranged to enable an operator to select both an automatic transmission mode wherein a gear change is automatically carried out and a manual transmission operation, or manual-shift, mode wherein gear-shifting is manually carried out by the vehicle operator. The manual-shift mode allows the operator to cause the automatic transmission to up-shift (referred to as a manual up-shift) or downshift (referred to as a manual downshift) independent of a predetermined shift map or other transmission control variables that the transmission controller may use to determine whether an up-shift or downshift should occur in the automatic transmission mode. The manual up or down shift may be controlled by manipulating a shift lever in a forward or backward direction or through similar type of manual shift control devices.

A manual downshift at a low accelerator pedal opening may occur when a vehicle operator manually initiates the gear ratio change, or downshift, for example, by manipulating the shift lever in the backward direction, while allowing the accelerator pedal to rise from the floor surface. The rising of the accelerator pedal allows the engine throttle opening to decrease in response to the movement of the pedal. The downshifting causes the transmission gear ratio to increase thereby causing the speed of the input shaft to increase. Because the engine is coupled to the automatic transmission via the input shaft, the engine speed is caused to increase as the speed of the input shaft increases. The energy required to accelerate the engine inertia and friction torque load is supplied by vehicle inertia in part due to the low accelerator pedal opening. This energy exchange causes the output torque supplied to the vehicle's ground engaging wheels to drop. The drop in output torque supplied to the vehicle's ground engaging wheels results in a bumpy undesirable feel commonly referred to as "shift-shock."

What is needed then is a method for reducing the shift-shock associated with manual downshifting at low accelerator pedal openings.

II. SUMMARY OF THE INVENTION

According to one embodiment of the invention, a method has the steps of providing a vehicle having an engine and an automatic transmission; determining a first hydraulic fluid pressure during an off-coming clutch phase; increasing the engine power when the first hydraulic fluid pressure reaches a first predetermined level; determining a second hydraulic fluid pressure; and, reducing the engine power substantially fully when the second hydraulic fluid pressure reaches a second predetermined level.

According to another embodiment of the invention, a method has the steps of providing a vehicle having an engine and an automatic transmission; transmitting a first input to a control unit, wherein the first input indicates the initiation of a manual downshift; determining a first hydraulic fluid pressure during an off-coming clutch phase; increasing the engine power when the first hydraulic fluid pressure reaches a first predetermined level; determining a second hydraulic fluid pressure; and, reducing the engine power substantially fully when the second hydraulic fluid pressure reaches a second predetermined level.

According to another embodiment of the invention, a method has the steps of providing a vehicle having an engine and an automatic transmission; transmitting at least a first input to a control unit, wherein the first input indicates the initiation of a manual downshift at a low accelerator pedal opening; determining a first hydraulic fluid pressure during an off-coming clutch phase; increasing the engine power when the first hydraulic fluid pressure reaches a first predetermined level; determining a second hydraulic fluid pressure; and, reducing the engine power substantially fully when the second hydraulic fluid pressure reaches a second predetermined level.

According to another embodiment of the invention, a method has the steps of providing a vehicle having an engine and an automatic transmission; determining a first hydraulic fluid pressure during an off-coming clutch phase; determining that a first hydraulic line pressure switch has changed from an on state to an off state; increasing the engine power when the first hydraulic fluid pressure reaches a first predetermined level; determining a second hydraulic fluid pressure; and, reducing the engine power substantially fully when the second hydraulic fluid pressure reaches a second predetermined level.

According to one embodiment of the invention, a method has the steps of providing a vehicle having an engine and an automatic transmission; determining a first hydraulic fluid pressure during an off-coming clutch phase; increasing the engine power when the first hydraulic fluid pressure reaches a first predetermined level; determining a second hydraulic fluid pressure; determining that a second hydraulic line pressure switch has changed from an off state to an on state; and, reducing the engine power substantially fully when the second hydraulic fluid pressure reaches a second predetermined level.

According to another embodiment of the invention, a method has the steps of providing a vehicle having an engine and an automatic transmission; determining a first hydraulic fluid pressure during an off-coming clutch phase; initiating a first delay and determining the expiration of the first delay; increasing the engine power when the first hydraulic fluid pressure reaches a first predetermined level; determining a second hydraulic fluid pressure; and, reducing the engine power substantially fully when the second hydraulic fluid pressure reaches a second predetermined level.

According to another embodiment of the invention, a method has the steps of providing a vehicle having an engine and an automatic transmission; determining a first hydraulic fluid pressure during an off-coming clutch phase; increasing the engine power when the first hydraulic fluid pressure reaches a first predetermined level; determining a second hydraulic fluid pressure; determining an effective gear ratio, wherein the effective gear ratio is greater than, less than, or substantially equal to a predetermined value; and, reducing the engine power substantially fully when the second hydraulic fluid pressure reaches a second predetermined level.

According to one embodiment of the invention, a method has the steps of: releasing an off-coming clutch; ensuring the release of the off-coming clutch by comparing a first hydraulic pressure with a predetermined hydraulic pressure; autonomously controlling a throttle opening; determining the engagement of an on-coming clutch by comparing a second hydraulic pressure with a second predetermined hydraulic pressure; and, terminating the autonomous control of the throttle opening substantially simultaneously with the engagement of the on-coming clutch.

According to another embodiment of the invention, a method has the steps of: releasing an off-coming clutch; ensuring the release of the off-coming clutch by comparing a first hydraulic pressure with a predetermined hydraulic pressure; autonomously controlling a throttle opening by increasing the throttle opening until an engine rotations per minute meets a first engine rotations per minute predetermined value; determining the engagement of an on-coming clutch by comparing a second hydraulic pressure with a second predetermined hydraulic pressure; and, terminating the autonomous control of the throttle opening substantially simultaneously with the engagement of the on-coming clutch.

According to another embodiment of the invention, a method has the steps of: releasing an off-coming clutch; ensuring the release of the off-coming clutch by comparing a first hydraulic pressure with a predetermined hydraulic pressure; utilizing a first hydraulic line pressure switch to ensure the release of the off-coming clutch; autonomously controlling a throttle opening; determining the engagement of an on-coming clutch by comparing a second hydraulic pressure with a second predetermined hydraulic pressure; and, terminating the autonomous control of the throttle opening substantially simultaneously with the engagement of the on-coming clutch.

According to another embodiment of the invention, a method has the steps of: releasing an off-coming clutch; ensuring the release of the off-coming clutch by comparing a first hydraulic pressure with a predetermined hydraulic pressure; utilizing a first hydraulic line pressure switch to ensure the release of the off-coming clutch; utilizing a timer and a first delay to ensure the release of the off-coming clutch; autonomously controlling a throttle opening; determining the engagement of an on-coming clutch by comparing a second hydraulic pressure with a second predetermined hydraulic pressure; and, terminating the autonomous control of the throttle opening substantially simultaneously with the engagement of the on-coming clutch.

According to another embodiment of the invention, a method has the steps of: releasing an off-coming clutch; ensuring the release of the off-coming clutch by comparing a first hydraulic pressure with a predetermined hydraulic pressure; autonomously controlling a throttle opening; determining the engagement of an on-coming clutch by comparing a second hydraulic pressure with a second predetermined hydraulic pressure; determining the engagement of the on-coming clutch by comparing a first gear ratio with a first predetermined gear ratio; and, terminating the autonomous control of the throttle opening substantially simultaneously with the engagement of the on-coming clutch.

According to one embodiment of the invention, a vehicle has a vehicle frame; an engine; an automatic transmission; a control system; and a throttle control device. The automatic transmission is mounted to the vehicle frame and operatively coupled to the engine. The control system is for use in controlling the engine power when a pressure switch device (1) determines that an off-going clutch is substantially released within the automatic transmission; and, (2) determines when an on-coming clutch is substantially fully engaged within the automatic transmission. The throttle control device (1) increases engine power after the off-going clutch is substantially released; and, (2) reduces engine power at substantially the same time the on-coming clutch is substantially engaged.

According to another embodiment of the invention, a vehicle has a vehicle frame; an engine; an automatic transmission; a control system; and a throttle control device. The automatic transmission is mounted to the vehicle frame and operatively coupled to the engine. The automatic transmission comprises a timer device for causing a first delay, wherein the control system initiates the first delay when the pressure switch device indicates the disengaging of the off-going clutch and the throttle control device reduces engine power at the expiration of the first delay. The control system is for use in controlling the engine power when a pressure switch device (1) determines that an off-going clutch is substantially released within the automatic transmission; and, (2) determines when an on-coming clutch is substantially fully engaged within the automatic transmission. The throttle control device (1) increases engine power after the off-going clutch is substantially released; and, (2) reduces engine power at substantially the same time the on-coming clutch is substantially engaged.

According to another embodiment of the invention, a vehicle has a vehicle frame; an engine; an automatic transmission; a control system; and a throttle control device. The automatic transmission is mounted to the vehicle frame and operatively coupled to the engine. The automatic transmission comprises a gear ratio device for determining when the on-coming clutch is substantially fully engaged. The control system is for use in controlling the engine power when a pressure switch device (1) determines that an off-going clutch is substantially released within the automatic transmission; and, (2) determines when an on-coming clutch is substantially fully engaged within the automatic transmission. The throttle control device (1) increases engine power after the off-going clutch is substantially released; and, (2) reduces engine power at substantially the same time the on-coming clutch is substantially engaged.

According to another embodiment of the invention, a vehicle has a vehicle frame; an engine; an automatic transmission; a control system; and a throttle control device. The automatic transmission is mounted to the vehicle frame and operatively coupled to the engine. The automatic transmission comprises a gear ratio device for determining when the on-coming clutch is substantially fully engaged. The gear ratio device determines when the on-coming clutch is substantially fully engaged by comparing a first gear ratio to a second gear ratio. The control system is for use in controlling the engine power when a pressure switch device (1) determines that an off-going clutch is substantially released within the automatic transmission; and, (2) determines when an on-coming clutch is substantially fully engaged within the automatic transmission. The throttle control device (1) increases engine power after the off-going clutch is substantially released; and, (2) reduces engine power at substantially the same time the on-coming clutch is substantially engaged.

According to another embodiment of the invention, a vehicle has a vehicle frame; an engine; an automatic transmission; a control system; and a throttle control device. The automatic transmission is mounted to the vehicle frame and operatively coupled to the engine. The automatic transmission comprises a gear ratio device for determining when the on-coming clutch is substantially fully engaged. The gear ratio device determines when the on-coming clutch is substantially fully engaged by comparing a first gear ratio to a second gear ratio. The first gear ratio is determined when a first hydraulic line pressure switch changes from a first on state to a first off state and the second gear ratio is determined when a second hydraulic line pressure switch changes from a second off state to a second on state. The control system is for use in controlling the engine power when a pressure switch device (1) determines that an off-going clutch is substantially released within the automatic transmission; and, (2) determines when an on-coming clutch is substantially fully engaged within the automatic transmission. The throttle control device (1) increases engine power after the off-going clutch is substantially released; and, (2) reduces engine power at substantially the same time the on-coming clutch is substantially engaged.

One advantage of this invention is that the shift-shock associated with the engagement of the on-coming clutch during a manual downshift at a low accelerator pedal opening is reduced.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 6 shows a flow chart of a method of manual downshifting according to another embodiment of the invention;

FIG. 7 shows a flow chart of a method of manual downshifting according to yet another embodiment of the invention.

IV. DETAILED DESCRIPTION OF THE INVENTION

Figure 1:
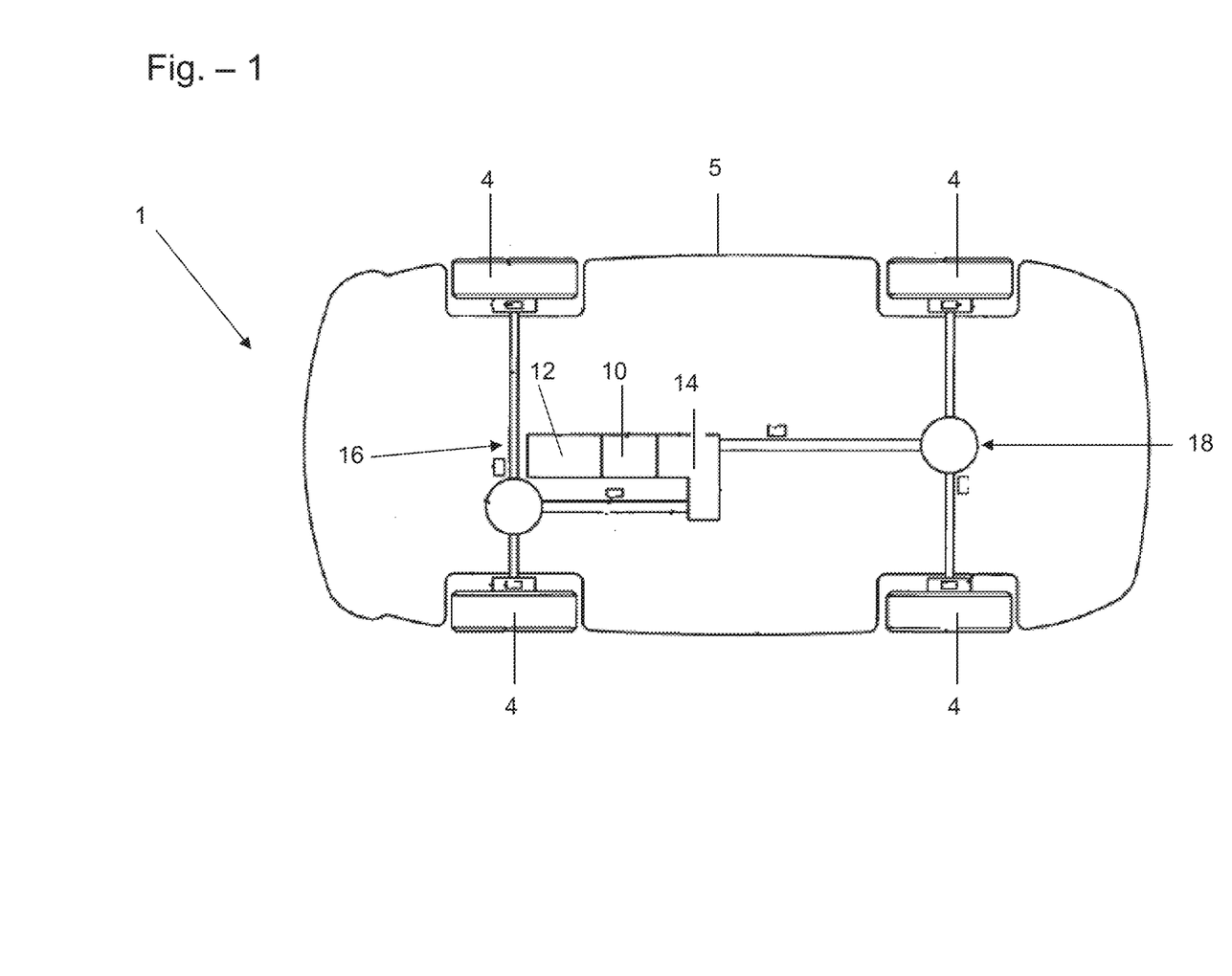
FIG. 1 shows a perspective outline view of the underside portion of a vehicle according to one embodiment of the invention.
Figure 2:
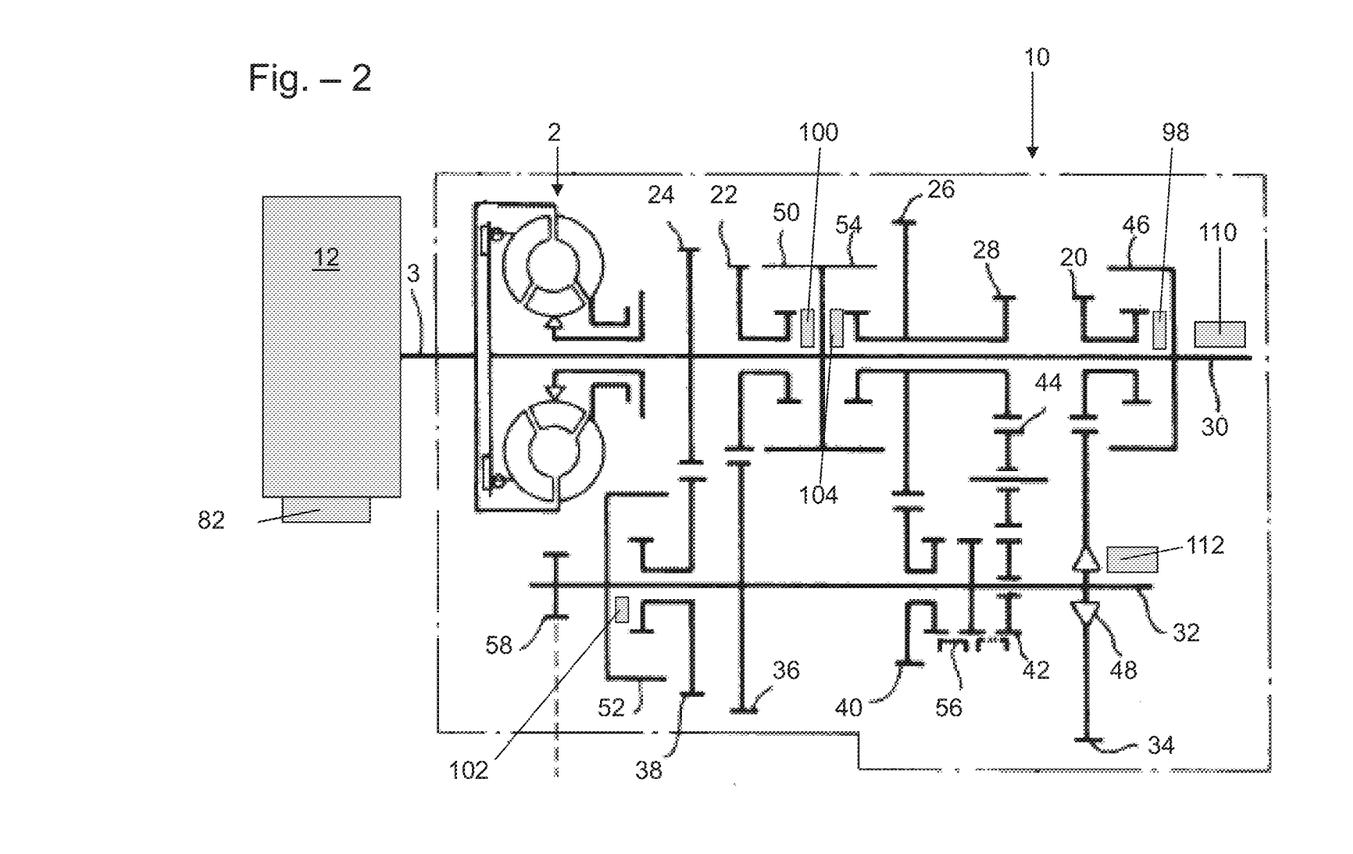
FIG. 2 shows a schematic view of an automatic transmission according to one embodiment of the invention.

Referring now to the drawings wherein the showings are for purposes of illustrating embodiments of the invention only and not for purposes of limiting the same, FIG. 1 shows a vehicle 1 comprising a frame 5, an automatic transmission 10, an engine 12, a transfer case 14, a front drive train 16, and a rear drive train 18. The engine 12 may cause the propulsion of the vehicle 1 by generating an input torque to the automatic transmission 10 via a torque converter 2 (as shown in FIG. 2). The automatic transmission 10 may be mounted to the frame 5 and may utilize a plurality of gear trains to alter the input torque. The altered input torque may then be supplied to the transfer case 14. The transfer case 14 may supply the altered input torque to one or both of the front and rear drive trains 16, 18 and then ultimately to a one or more of the ground engaging wheels 4.

With reference now to FIGS. 1-2, the automatic transmission 10 may comprise an input or main shaft 30 that may be operatively coupled to a crankshaft 3 of the engine 12 through the torque converter 2. The main shaft 30 may be connected to an output or counter shaft 32 through the plurality of gear trains. The automatic transmission 10 may further comprise an electronic control unit (ECU) 60 (shown schematically in FIG. 3), a main first-shift gear 20, a main second-shift gear 22, a main third-shift gear 24, a main fourth shift-gear 26, and a main reverse gear 28. The main first-shift gear 20, the main second-shift gear 22, the main third-shift gear 24, the main fourth shift-gear 26, and the main reverse gear 28 may each be carried on the main shaft 30. The counter shaft 32 may carry a counter first-shift gear 34, a counter second-shift gear 36, a counter third shift-gear 38, a counter fourth shift-gear 40, and a counter reverse gear 42. The counter first shift-gear 34 may be meshed with the main first-shift gear 20. The counter second-shift gear 36 may be meshed with main second-shift gear 22. The counter third-shift gear 38 may be meshed with the main third-shift gear 24. The counter fourth-shift gear 40 may be meshed with the main fourth-shift gear 26. The counter reverse gear 42 may be connected to the main reverse gear 28 through a reverse idle gear 44.

With continuing reference to FIGS. 1-2, according to one embodiment, the main first-shift gear 20 may be relatively rotatably carried on the main shaft 30 and may be coupled to the main shaft 30 by a first-shift clutch 46 to establish a first-shift stage. The first-shift clutch 46 may be maintained in an engaged state even during establishment of second through fourth shift stages and hence, the counter first-shift gear 34 may be supported through a one-way clutch 48. The main second-shift gear 22, that may be relatively rotatably carried on the main shaft 30, may be coupled to the main shaft 30 by a second-shift clutch 50 to establish a second-shift stage. The counter third-shift gear 38, that may be relatively rotatably carried on the counter shaft 32, may be coupled to the counter shaft 32 by a third-shift clutch 52 to establish a third-shift stage. The main fourth-shift gear 26, that may be relatively rotatably carried on the main shaft 30, may be coupled to the main shaft 30 by a fourth-shift reverse clutch 54 in a condition in which the counter fourth-shift gear 40, that may be relatively rotatably carried on the counter shaft 32, may be coupled to the counter shaft 32 by a selector gear 56, to establish a fourth-shift stage. The main reverse gear 28, that may be relatively rotatably carried on the main shaft 30, may be coupled to the main shaft 30 by the fourth-shift reverse clutch 54 in a condition in which the counter reverse gear 42, that may be relatively rotatably carried on the counter shaft 32, may be coupled to the counter shaft 32 by the selector gear 56, to establish a backward-shift stage. The rotation of the counter shaft 32 may be transmitted through a final drive gear 58 to the transfer case 14 and then to one or both of the front and rear drive trains 16, 18 and ultimately to one or more of the plurality of ground engaging wheels 4.

Figure 3:
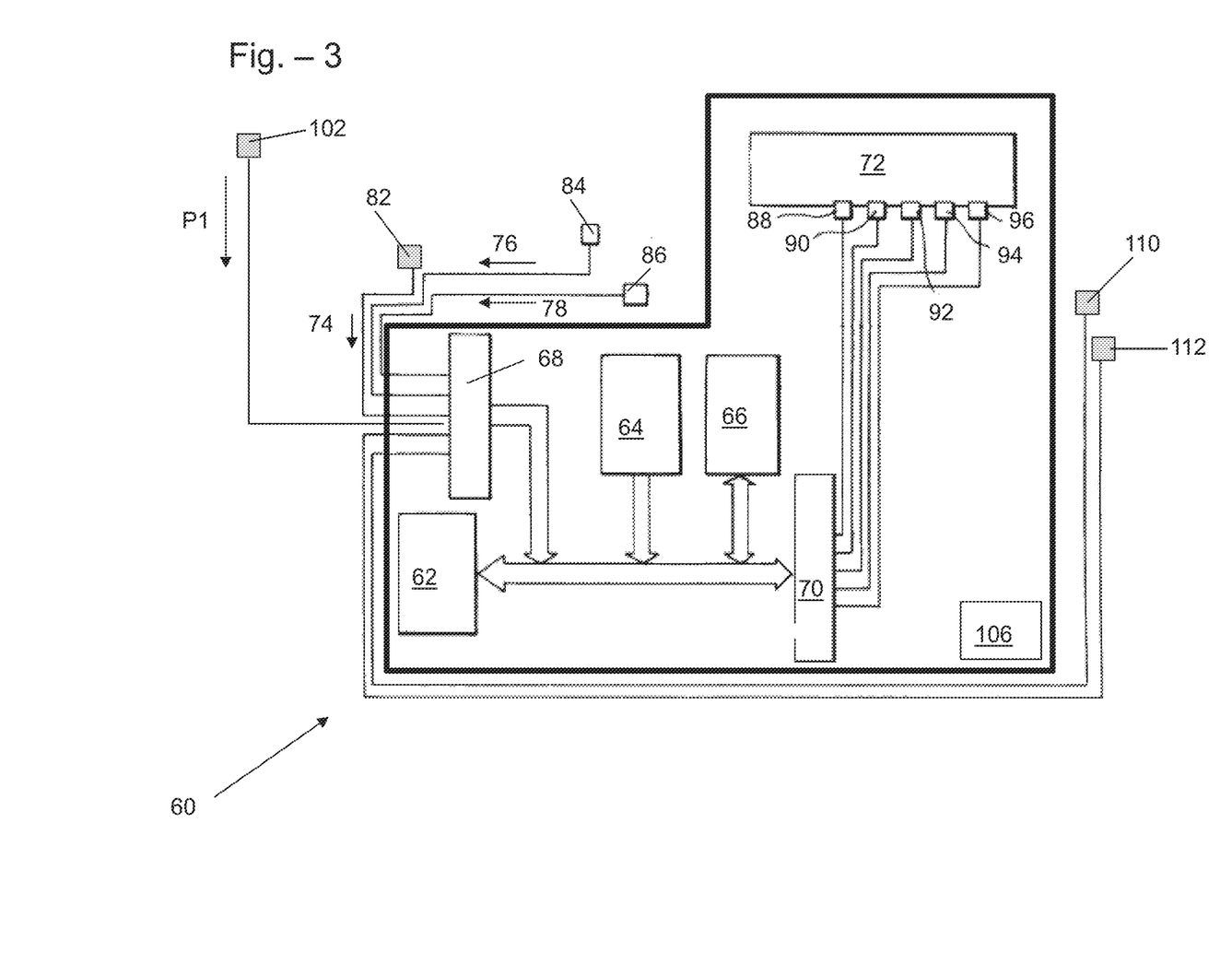
FIG. 3 shows a block diagram view of an electronic control unit according to one embodiment of the invention.

With reference now to FIGS. 2-3, the ECU 60 may comprise a central processing unit 62, a read only memory (ROM) 64, a random access memory (RAM) 66, an input circuit 68, an output circuit 70, and a hydraulic pressure control circuit 72. The input circuit 68 may receive a plurality of inputs indicative of the vehicle operating conditions and the driver inputs. In one embodiment, the plurality of inputs to the input circuit 68 may include a throttle opening input 74, a vehicle speed input 76, a shift lever position input 78, and an accelerator pedal opening input 80. A throttle opening degree sensor 82 mounted on the engine 12 may determine and transmit the throttle opening input 74 to the input circuit 68. A vehicle speed sensor 84 positioned on the front and rear drive trains 16, 18 may determine and transmit the vehicle speed input 76 to the input circuit 68. A shift lever sensor 86 may determine and transmit the shift lever position input 78 to the input circuit 68. The ECU 60 may utilize data contained in the throttle opening input 74, the vehicle speed input 76, and the shift lever position input 78 to determine the status of the accelerator pedal opening thereby allowing the ECU 60 to determine the occurance of a manual downshift at a low accelerator pedal opening. The plurality of inputs and their corresponding sensors for determining and transmitting the inputs to the input circuit 68 may comprise any type and number chosen with the sound judgment of a person using ordinary skill in the art. Further, the ECU 60 may utilize any number or combination of transmitted inputs to determine the occurance of a manual downshift at a low accelerator pedal opening chosen with the sound judgment of a person using ordinary skill in the art.

Figure 4:
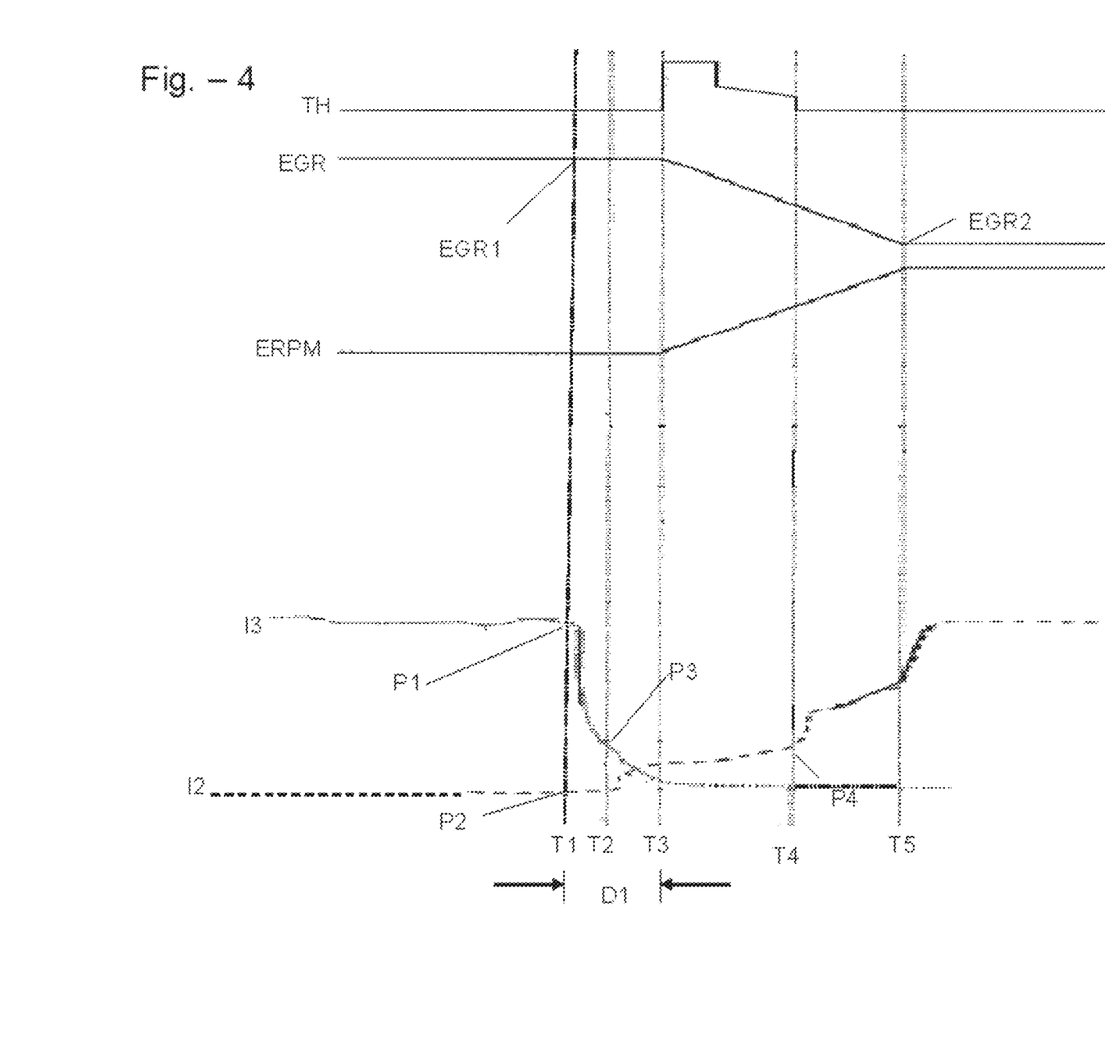
FIG. 4 shows a timing diagram for an automatic transmission according to one embodiment of the invention.
Figure 5:
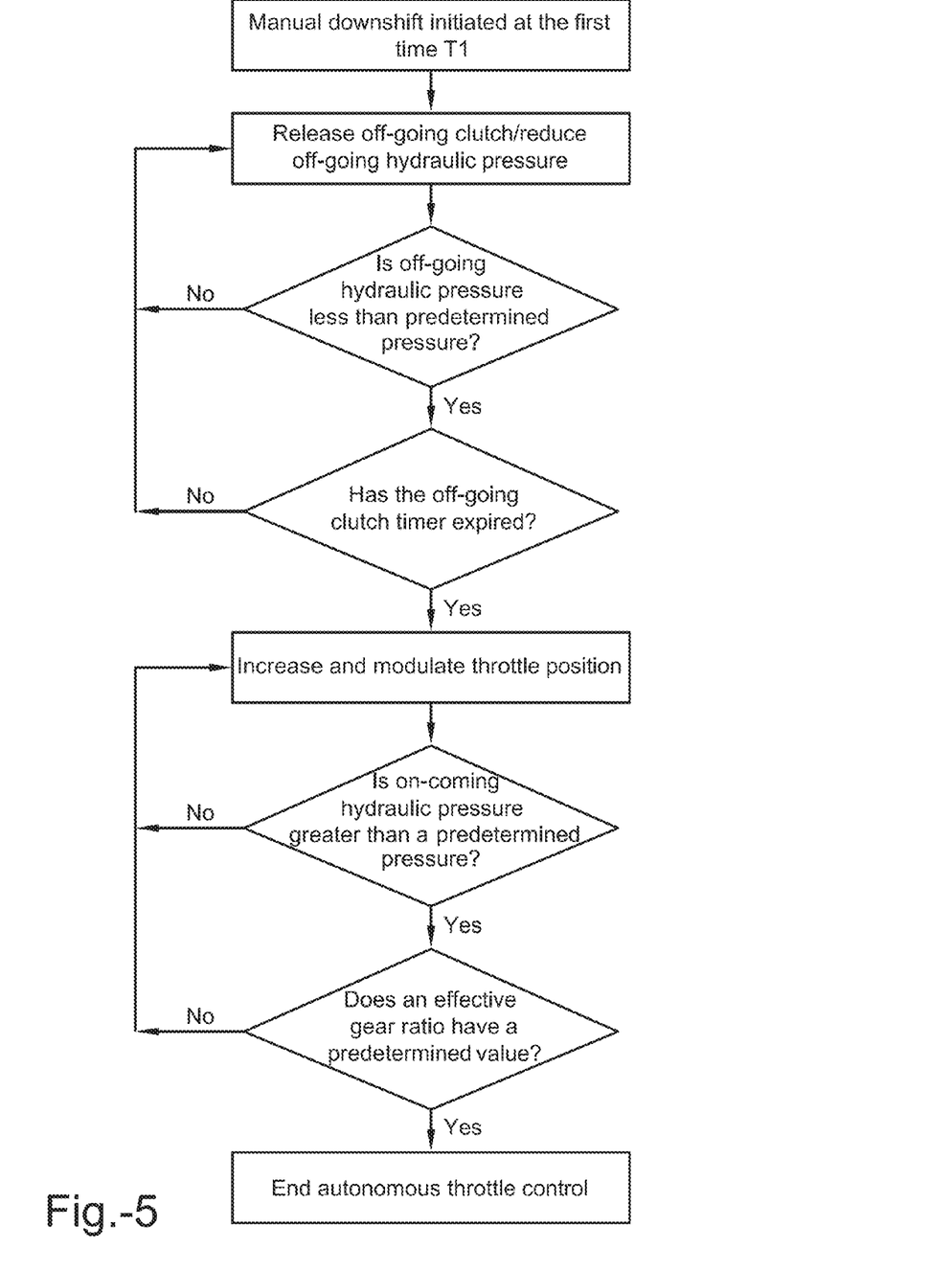
FIG. 5 shows a flow chart of a method of manual downshifting according to one embodiment of the invention.

With reference now to FIGS. 2-4, the output circuit 70 may be connected to a first shift solenoid 88, a second shift solenoid 90, a first lock-up clutch solenoid 92, a second lock-up clutch solenoid 94, and a shifting clutch hydraulic pressure solenoid 96. The first shift solenoid 88, the second shift solenoid 90, the first lock-up clutch solenoid 92, the second lock-up clutch solenoid 94, and the shifting clutch hydraulic pressure solenoid 96 may be provided to the hydraulic control circuit 72 in order to control the operation of the first-shift clutch 46, the second-shift clutch 48, the third-shift clutch 50, the fourth-shift clutch 52, and the selector gear 56. The hydraulic circuit 72 may further comprise a plurality of hydraulic line pressure switches located within the hydraulic circuit wherein a first hydraulic line pressure switch 98 may correspond to the first-shift clutch 46, a second hydraulic line pressure switch 100 may correspond to the second-shift clutch 50, a third hydraulic line pressure switch 102 the third-shift clutch 52, and a fourth hydraulic line pressure switch 104 may correspond to the fourth-shift reverse clutch 54. The plurality of hydraulic line pressure switches may be "on" when the pressure of the hydraulic fluid reaches a minimum pressure and "off" when the pressure of the hydraulic fluid is below the minimum pressure. When the pressure switch is on, an electrical contact may be made thereby causing the transmission of a signal to the input circuit 68. The transmission of the signal to the input circuit 68 at least partially allows the ECU 60 to determine the state of each of the plurality of pressure switches.

With reference now to FIGS. 2-5, the manual downshifting at a low accelerator pedal opening will be generally described. For ease of description, only one manual downshifting at a low accelerator pedal opening operation, for example, from the third-shift stage to the second-shift stage, will be described. It is to be understood, however, that this invention will work with any downshifting chosen with the sound judgment of a person using ordinary skill in the art. The manual downshift at a low accelerator pedal opening may comprise the shift lever sensor 86 transmitting the shift lever position input 78 indicating the initiation of a manual downshift at a first time T1. For example, in one embodiment, the shift lever sensor 86 may determine that a shift lever (not shown) has been manipulated in the forward or reverse direction thereby intiating the manual downshift. The shift lever sensor 86 may transmit the shift lever position input 78 indicating the initiation of the manual downshift to the input circuit 68. The third hydraulic line pressure switch 102 may be in the "ON" state thereby indicating at least a first line pressure P1 to the input circuit 68 corresponding to the engagement of the third-shift stage. The second hydraulic line pressure switch 100 may be in the "OFF" state thereby indicating a second line pressure P2, wherein the second line pressure is less than a minimum pressure necessary for the engagement of the second-shift stage, to the input circuit 68. The throttle opening degree sensor 82 may transmit the throttle opening input 74 and the vehicle speed sensor 84 may transmit the vehicle speed input 76 the input circuit 68. Based at least partially on the inputs received by the input circuit 68, the ECU 60 may determine the initiation of a manual downshift at a low accelerator pedal opening. The ECU 60 may cause the hydraulic pressure control circuit 72 to cause the third-shift clutch 52 to gradually decrease engagement of the main third shift-gear 24 with the main shaft 30 (that is, is off-going) thereby initiating the off-coming clutch phase. At a second time T2, the third hydraulic line pressure switch 102 may switch to the "OFF" state, breaking the electrical contact created in the "ON" state thereby indicating a third line pressure P3 wherein the third line pressure P3 is less than the first line pressure P1 to the input circuit 68. The ECU 60 may determine that the third line pressure P3 is substantially equal to or less than a predetermined off-going line pressure wherein the predetermined line pressure indicates the substantially complete disengagement of the third-shift clutch 52 (that is, the third-shift clutch 52 is substantially released). At a third time T3, the ECU 60 may cause the autonomous increase and modulation of a throttle position TH until the engine-rotations-per-minute ERPM of the engine 12 causes the input shaft 3 to rotate at a predetermined number of rotations per minute. In one embodiment, the second time T2 and the third time T3 may occur substantially simultaneously. In another embodiment, at the first time T1 the ECU 60 may initiate an off clutch capacity delay timer 106 thereby initiating a first delay D1. The expiration of the first delay D1 may occur at the third time T3. The ECU 60 may delay causing the autonomous increase and modulation of the throttle position until the expiration of the first delay D1 in order to compensate for various external variables such as, for example, hydraulic fluid temperature and atmospheric pressure.

With reference to FIGS. 2-7, at the third time T3 the ECU 60 may cause the hydraulic pressure control circuit 72 to cause the second-shift clutch 50 to gradually increase engagement of the main second shift-gear 22 with the main shaft 30 (that is, is on-coming) initiating the on-coming clutch phase. At a fourth time T4 the second hydraulic line pressure switch 100 may change from the "OFF" state to the "ON" state, thereby creating an electrical contact to be made indicating a fourth hydraulic line pressure P4. The fourth hydraulic pressure P4 is greater than the minimum hydraulic pressure required to engage the second-shift clutch 50. The ECU 60 may determine that the fourth hydraulic line pressure P4 is substantially equal to or greater than a predetermined on-coming line pressure wherein the predetermined on-coming line pressure indicates the engagement of the second-shift clutch 50. At the fourth time T4 the ECU 60 may terminate the autonomous increase and modulation of the throttle position thereby reducing the engine power substantially completely. In one embodiment, the ECU 60 may terminate the autonomous increase and modulation of the throttle position at the later of the fourth time T4 or upon the ECU 60 determining that the effective gear ratio has reached a predetermined gear ratio associated with the second-shift stage. For example, in one embodiment, the ECU 60 may determine that the effective gear ratio has reached a predetermined gear ratio at least in part by a main shaft sensor 110 transmitting a main shaft input indicating the speed of rotation of the main shaft 30 and therefore the engine 12, to the input circuit 68. Additionally, a countershaft sensor 112 may transmit a countershaft input indicating the speed of rotation of the countershaft 32, to the input circuit 68. The ECU 60 may then determine an effective gear ratio EGR by comparing a first effective gear ratio EGR1 determined at the first time T1 with a second effective gear ratio EGR2 determined at a fifth time T5 to determine that the second-shift stage is engaged. In one embodiment, the fifth time T5 occurs after or later than the fourth time T4. In another embodiment the fifth time T5 and the fourth time T4 occur substantially simultaneously.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A method comprising the steps of:
   (a) providing a vehicle having a vehicle frame, an engine and an automatic transmission that is mounted to the vehicle frame and operatively connected to the engine;
   (b) determining a first hydraulic fluid pressure during an off-coming clutch phase;
   (c) triggering an increase in the engine power due to the first hydraulic fluid pressure reaching a first predetermined level;
   (d) determining a second hydraulic fluid pressure; and,
   (e) triggering a reduction in the engine power substantially fully due to the second hydraulic fluid pressure reaching a second predetermined level.

2. The method of claim 1, wherein step (a) further comprises the step of:
   transmitting a first input to a control unit, wherein the first input indicates the initiation of a manual downshift.

3. The method of claim 1, wherein step (a) further comprises the step of:
   transmitting at least a first input to a control unit, wherein the first input indicates the initiation of a manual downshift at a low accelerator pedal opening.

4. The method of claim 1, wherein step (b) further comprises the step of:
   determining that a first hydraulic line pressure switch has changed from an on state to an off state.

5. The method of claim 1, wherein step (d) further comprises the step of:
   determining that a second hydraulic line pressure switch has changed from an off state to an on state.

6. The method of claim 1, wherein step (b) further comprises the steps of:
   initiating a first delay; and, determining the expiration of the first delay.

7. The method of claim 6 wherein:
   the expiration of the first delay triggers a "timer expired" signal; and
   the increase in the engine power in step (c) occurs only if the "timer expired" signal has also been triggered.

8. The method of claim 1, wherein step (d) further comprises the step of:
   determining an effective gear ratio, wherein the effective gear ratio is substantially equal to or greater than a predetermined value.

9. The method of claim 8 wherein the effective gear ratio is determined by comparing a first gear ratio with a second gear ratio;
   wherein the first gear ratio is determined during step (b) at the time of and due to the first hydraulic pressure reaching a first predetermined level; and
   wherein the second gear ratio is determined during step (d) at the time of and due to the second hydraulic fluid pressure reaching a second predetermined level.

10. The method of claim 1, wherein step (d) further comprises the step of:
    determining an effective gear ratio, wherein the effective gear ratio is substantially equal to or less than a predetermined value.

11. The method of claim 1, wherein step (d) further comprises the step of:
    determining an effective gear ratio, wherein the effective gear ratio is greater than a predetermined value.

12. The method of claim 1, wherein step (d) further comprises the step of:
    determining an effective gear ratio, wherein the effective gear ratio is less than a predetermined value.

13. A vehicle comprising:
    a vehicle frame;
    an engine;
    an automatic transmission, wherein the automatic transmission is mounted to the vehicle frame and operatively connected to the engine;
    a control system for use in controlling the engine power when a pressure switch device:
    (1) determines that an off-going clutch is substantially released within the automatic transmission; and, (2) determines when an on-coming clutch is substantially fully engaged within the automatic transmission; and
    a throttle control device that: (1) increases engine power triggered by the off-going clutch becoming substantially released; and, (2) reduces engine power triggered by the on-coming clutch becoming substantially engaged.

14. The vehicle of claim 13 wherein the automatic transmission comprises:
a timer device for causing a first delay, wherein the control system initiates the first delay due to the pressure switch device indicating the disengaging of the off-going clutch, and wherein the throttle control device increases engine power due to the expiration of the first delay.

15. The vehicle of claim 13 wherein the automatic transmission comprises:
a gear ratio device for determining when the on-coming clutch is substantially fully engaged.

16. The vehicle of claim 15, wherein the gear ratio device determines when the on-coming clutch is substantially fully engaged by comparing a first gear ratio to a second gear ratio.

17. The vehicle of claim 16, wherein the first gear ratio is determined when a first hydraulic line pressure switch changes from a first on state to a first off state and the second gear ratio is determined when a second hydraulic line pressure switch changes from a second off state to a second on state.

* * * * *